US011588768B2

United States Patent
Shetty et al.

(10) Patent No.: US 11,588,768 B2
(45) Date of Patent: Feb. 21, 2023

(54) INTELLIGENT MANAGEMENT OF HERO CARDS THAT DISPLAY CONTEXTUAL INFORMATION AND ACTIONS FOR BACKEND SYSTEMS

(71) Applicant: VMWARE, INC., Palo Alto, CA (US)

(72) Inventors: Rohit Pradeep Shetty, Bangalore (IN); Shree Harsha Shedigumme, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/192,933

(22) Filed: Mar. 5, 2021

(65) Prior Publication Data

US 2022/0231977 A1    Jul. 21, 2022

(30) Foreign Application Priority Data

Jan. 20, 2021    (IN) .............................. 202141002672

(51) Int. Cl.
*H04L 51/043*    (2022.01)
*H04L 51/08*    (2022.01)
*G06F 3/0482*    (2013.01)
*H04L 51/234*    (2022.01)

(52) U.S. Cl.
CPC ............ *H04L 51/08* (2013.01); *G06F 3/0482* (2013.01); *H04L 51/043* (2013.01); *H04L 51/234* (2022.05)

(58) Field of Classification Search
CPC ..... H04L 51/04; H04L 51/16; H04L 65/1066; H04L 67/306; H04L 51/08; H04L 51/043; H04L 51/234; G06F 3/0482
See application file for complete search history.

(56) References Cited

U.S. PATENT DOCUMENTS

| | | | |
|---|---|---|---|
| 9,720,527 B2* | 8/2017 | Zhang | G06F 3/03547 |
| 11,169,675 B1* | 11/2021 | Anvaripour | H04L 51/10 |
| 2007/0299923 A1 | 12/2007 | Skelly | |
| 2008/0320093 A1 | 12/2008 | Thorne | |
| 2011/0119258 A1 | 5/2011 | Forutanpour | |
| 2011/0302025 A1 | 12/2011 | Hsiao | |
| 2012/0240054 A1 | 9/2012 | Webber | |
| 2013/0086180 A1 | 4/2013 | Midgen | |
| 2015/0378537 A1* | 12/2015 | Marimuthu | G06F 9/451 |
| | | | 715/745 |
| 2016/0085430 A1* | 3/2016 | Moran | H04M 1/72454 |
| | | | 715/765 |
| 2016/0320926 A1 | 11/2016 | Ganin | |
| 2017/0118308 A1 | 4/2017 | Vigeant | |

(Continued)

*Primary Examiner* — Ryan J Jakovac

(74) *Attorney, Agent, or Firm* — Clayton, McKay & Bailey, PC

(57) ABSTRACT

Methods and systems are described for intelligently managing hero cards generated for a user profile. In an example, a server can collect user interaction data that measures how a user interacts with system components. The system components can include emails, hero cards, and software applications. The server can analyze the user interaction data to determine whether a new hero card type should be enabled for a user profile, whether an active hero card type should be disabled for the user profile, and whether parameters for action options on hero cards should be changed for the user profile. The server can make changes to hero cards for the user profile so that the user can receive customized hero cards based on the user's behavior.

17 Claims, 8 Drawing Sheets

(56) References Cited

U.S. PATENT DOCUMENTS

2017/0318335 A1 11/2017 Ding
2020/0150853 A1 5/2020 Kulkarni
2020/0272622 A1 8/2020 Amel

* cited by examiner

INTELLIGENT MANAGEMENT OF HERO CARDS THAT DISPLAY CONTEXTUAL INFORMATION AND ACTIONS FOR BACKEND SYSTEMS

RELATED APPLICATIONS

Benefit is claimed under 35 U.S.C. 119(a)-(d) to Foreign Application Serial No. 202141002672 filed in India entitled "INTELLIGENT MANAGEMENT OF HERO CARDS THAT DISPLAY CONTEXTUAL INFORMATION AND ACTIONS FOR BACKEND SYSTEMS", on Jan. 20, 2021, by VMware, Inc., which is herein incorporated in its entirety by reference for all purposes The present application is related in subject matter to U.S. patent application Ser. No. 17/192,921, which is incorporated herein by reference

BACKGROUND

Work efficiency is a goal of all enterprise systems. Enterprises use a vast number of different systems and applications designed to increase user productivity. Although many technological advances have helped users increase their efficiency, the number of systems used to track every aspect of our work also increases the amount of information each enterprise user must process. Keeping all of these systems up to date can introduce additional steps into the user's workflow. The more systems and tools put at the user's disposal, the more information the user must move between the different applications and systems. For example, when a user receives an email, they may need to update a status in SALESFORCE, JIRA, CONCUR, an internal docketing system, and other services. This can be time consuming, especially for a user of a mobile device. Additionally, the user might not realize the significance of content received in one application to information in another system.

To solve this, some organizations have implemented software that gathers content from backend systems relevant to users and presents the content in a graphical user interface ("GUI") for the user. Some such software presents the data in a card-based format. However, these solutions apply broad rules across an organization for compiling and presenting the content. This results in many users being presented with content, and in some cases options for interacting with the content, that they do not find useful. Their GUI becomes cluttered with information that they have to parse through to find what they may actually need. This wastes valuable time, and these users often get frustrated choose to not use the software altogether.

Additionally, existing systems present notifications with static response options. The various response options can compete for screen space, which is particularly valuable in mobile devices such as phones. This can result in a situation where screen space becomes occupied and cluttered even though the user seldom or never uses particular response options.

As a result, a need exists for intelligently managing and customizing hero cards that display contextual and relevant information for backend systems.

SUMMARY

Examples described herein include systems and methods for intelligently managing hero cards that display contextual information and actions for backend systems. The hero cards can display contextual information-based relationships between content in an application and information and actions in one or more backend systems. Based on user behavior, the system can dynamically determine which hero cards to display and which actions to include on those cards.

In an example, a hero agent executing on a user device can communicate with an email application. The hero agent can collect data from the email relating to the emails received at the email application and a user's interactions with the emails. The hero agent can send the user interaction data to a hero server. The hero server can measure the frequency in which the user performs certain types of action for an email type over a given time period. As an example, the hero server can determine how frequently the user selects a link in emails from a specific sender.

In one example, the hero server can calculate a score based on the user interactions that indicates a user's interest in emails of the email type. For example, the hero server can assign scores to certain user actions and increase or decrease the user interaction score based on the user actions. In one example, the hero server can weight scores based on how frequently the user receives emails of the email type. In another example, the interaction frequency can be based on a ratio of the number of user interactions of at least one user interaction type with emails of the email type to a number of emails of the email type received over a measured time period.

In one example, the hero server can compare the user interaction frequency, or score, for emails of the email type to a threshold. The threshold can be a number that indicates whether generating hero cards would be useful to the user. For example, where the user interaction frequency exceeds a threshold, the hero server can enable the creation of hero cards for that user when the user receives emails of the email type.

In an example, the hero server can modify parameters for generating hero cards for a user based on the user's activity. For example, the hero server can measure the frequency that a user interacts with hero cards presented on the user's device. Where the user ignores, or does not interact with, hero cards of a hero type at a predetermined rate, the hero server can disable the creation of hero cards of that type for the user. This can help declutter hero cards presented to the user.

In one example, the hero server can modify parameters for action options on hero cards for a user based on the user's behavior. Action options can be interactive elements in a hero card that allow a user to perform an action at a backend system from within the hero card. In one example, the hero server can modify action options based on user groups. For example, for a certain hero card type, the hero server can present one set of action options for management users and a different set of action options for engineering users.

In one example, the hero server can analyze user interaction data to determine what action options would be most useful to a user. For example, the hero server can receive user interaction data based on actions performed by a user as related to a particular backend system. As some examples, the hero server can receive data about how the user interacts with hero cards related to the backend system, emails from the backend system indicating status changes caused by user actions, and data from the backend system of user interactions performed in the backend system under the user profile. The hero server can use this user interaction data to create new action options or to determine which existing actions would be most useful to the user.

In an example, the hero server can modify parameters for hero cards based on the interaction data. In one example, where a user interacts with an action button less frequently than a predetermined threshold, the hero server can change parameters of hero cards for the user to either remove or replace that action option on hero cards. In another example, the hero server can analyze user interaction data of other user's in an associated group of the user to choose action options for the user based on which action options are most used by the other users. In another example, the hero server can create new action options or modify hero card parameters to include action options based on which actions the user most frequently performs when interfacing directly within the associated application. This can result in a hero card that displays with a subset of possible actions based on the user's own behavior, which can declutter the screen.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Methods and systems are described for intelligently managing hero cards generated for a user profile. In one example, a system dynamically builds hero cards that draw relationships between content in an application and information and actions in one or more backend systems. The hero cards can display contextual information based on these relationships.

A hero agent installed on a user device can collect data of a user's interactions with applications on the user device. In one example, the hero agent can measure user interactions with emails received at the user device. A hero server can analyze the user's interactions with an email type for which hero cards are not being generated for the user. Based on the user interaction data, the hero server can enable hero card generation for the user's profile for emails of the email type.

In one example, the hero agent can measure a user's interactions with hero cards presented to the user. This can include how frequently the user interacts with hero cards of each type and how frequently the user interacts with action options on the hero cards. The hero server can analyze the user's interactions and perform an action based on the user's interaction behavior. In one example, the hero server can retrieve information about the user's role to help determine which action to take. In another example, the hero server can receive user interaction data from a backend system related to a hero card type to help determine which action to take.

In one example, the hero server can modify hero cards generated for the user profile based on the user's role. The user's role can be associated with a group to which the user profile belongs. In another example, the hero server can disable creation of hero cards of a hero card type where the user's interaction frequency with hero cards of the type drops below a threshold. In another example, the hero server can remove or replace an action option on a hero card type based on a user not interacting frequently enough with the action option. In another example, the hero server can add an action option to hero cards of a certain type based on a user frequently performing an action with a backend system, such as a third-party software.

Figure 1:
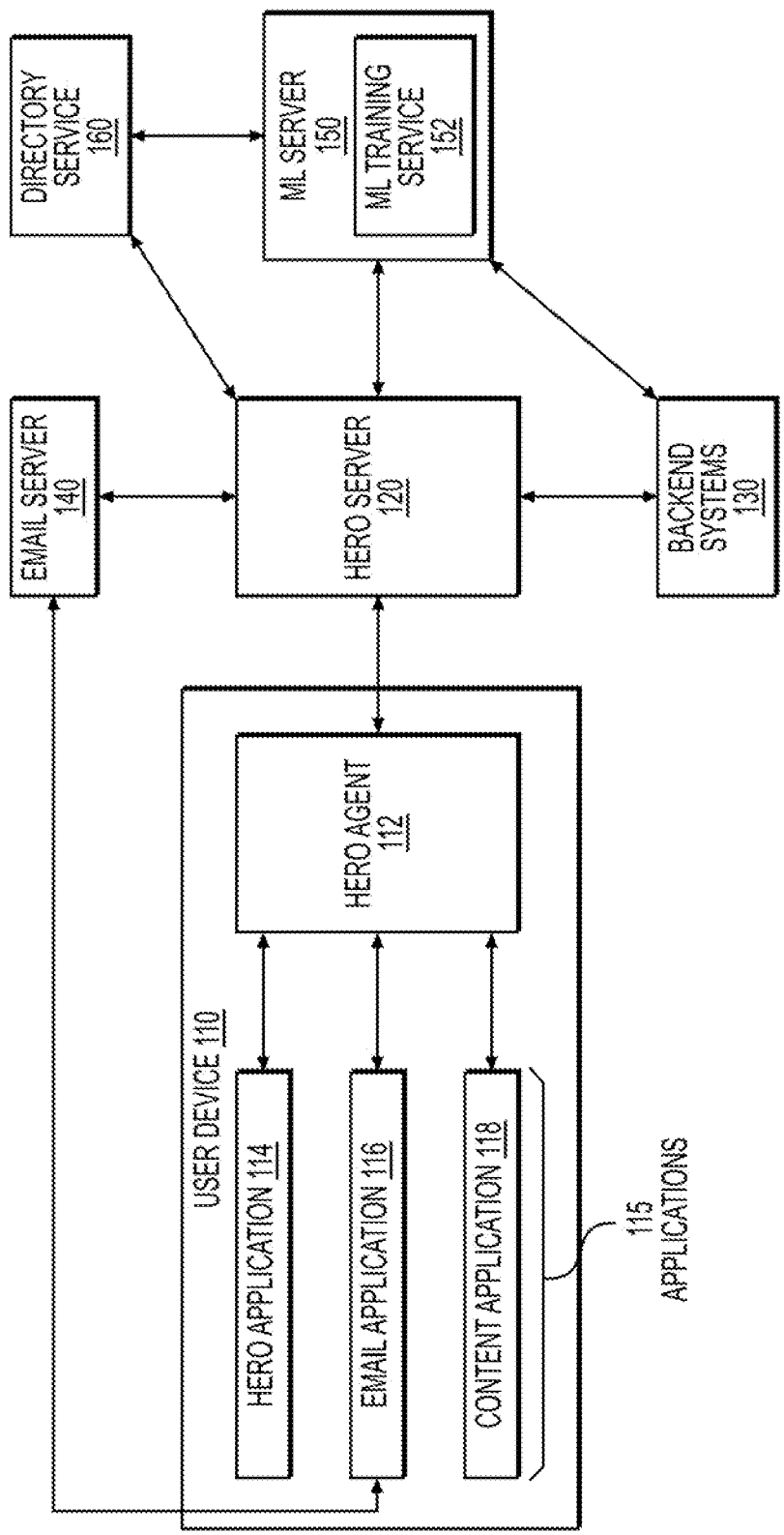
FIG. 1 is an illustration of an example system for intelligently managing hero cards.
Figure 2:
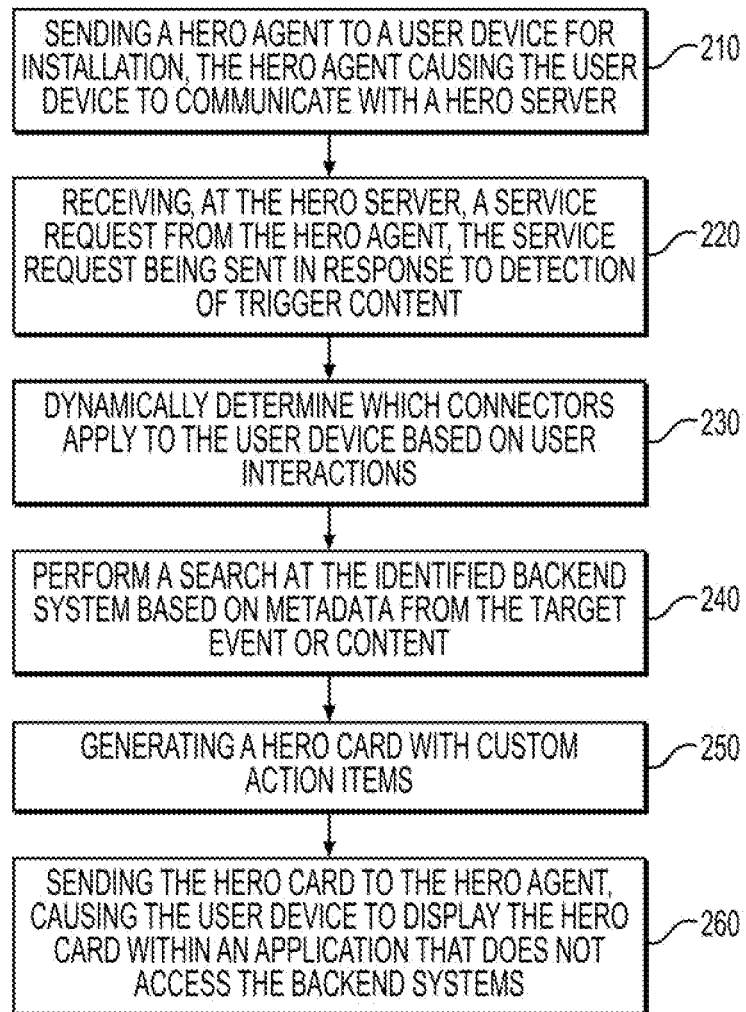
FIG. 2 is a flowchart of an example method for creating hero cards.
Figure 3:
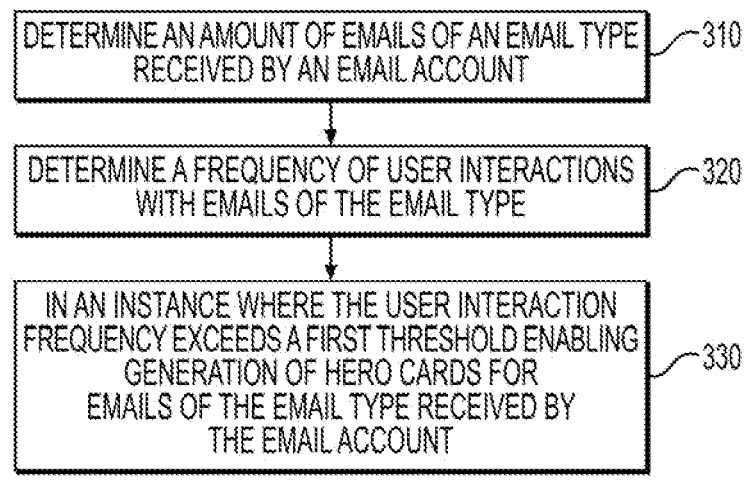
FIG. 3 is a flowchart of an example method for intelligently managing hero cards.
Figure 4:
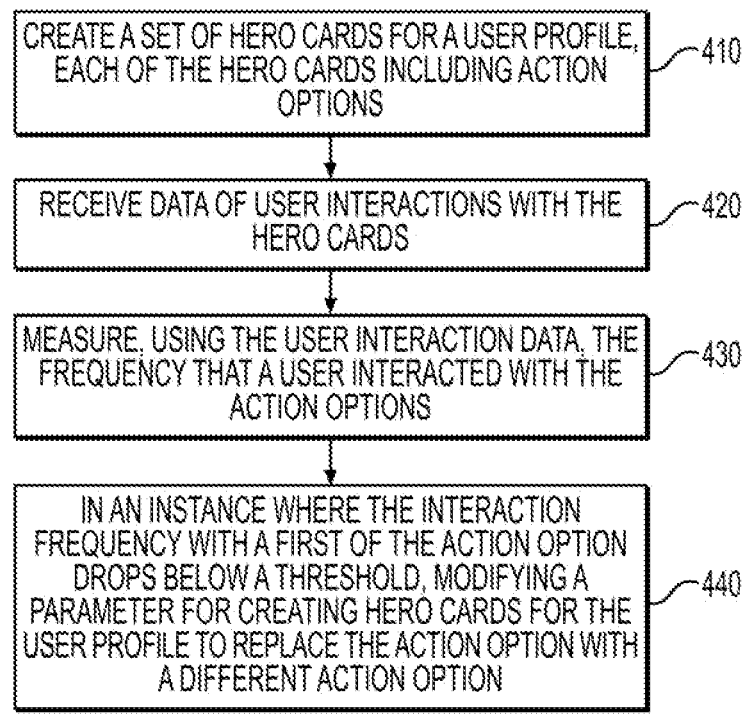
FIG. 4 is a flowchart of an example method for customizing action options in hero cards.
Figure 5:
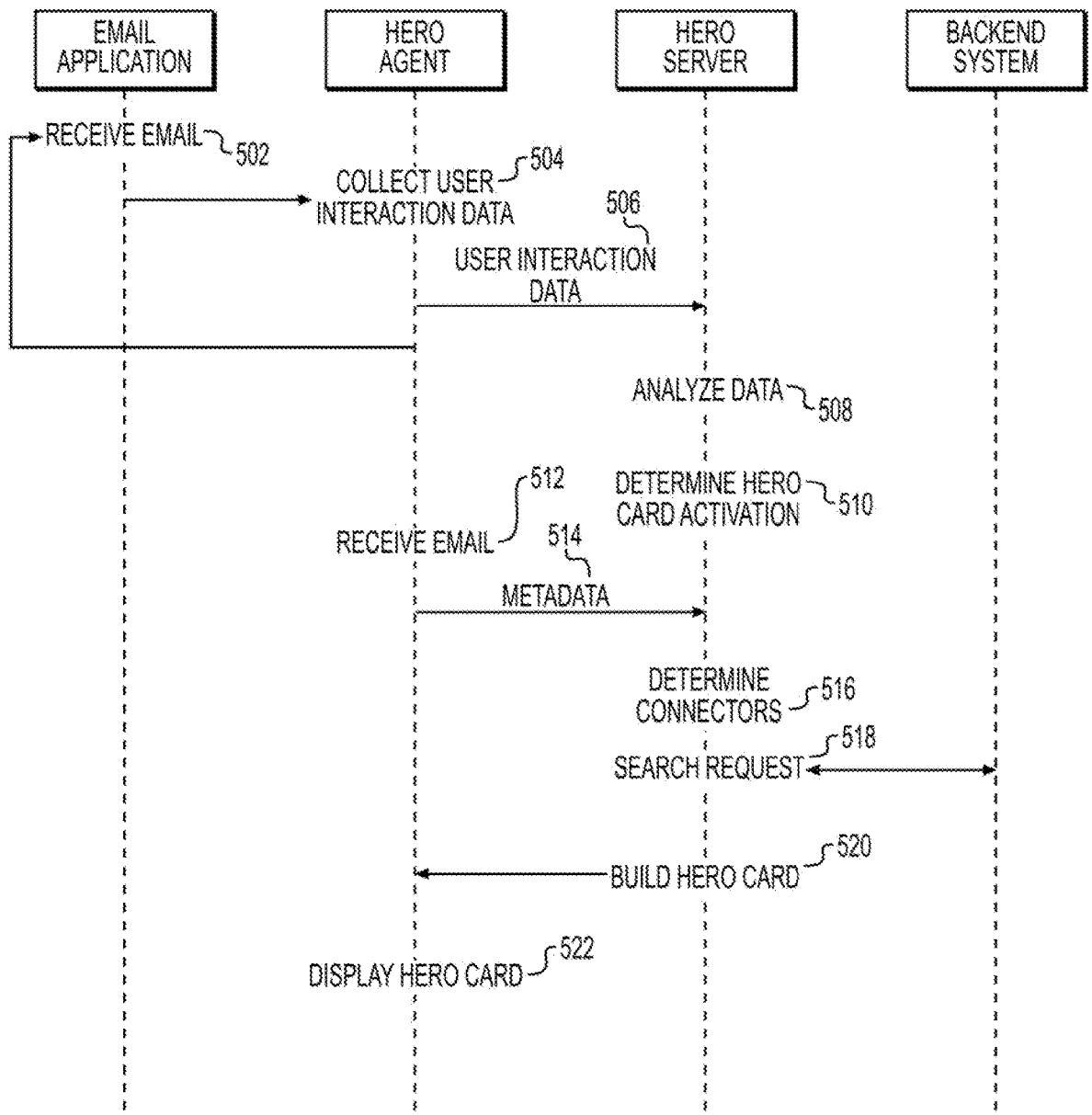
FIG. 5 is a sequence diagram of an example method for intelligently managing hero cards.
Figure 6:
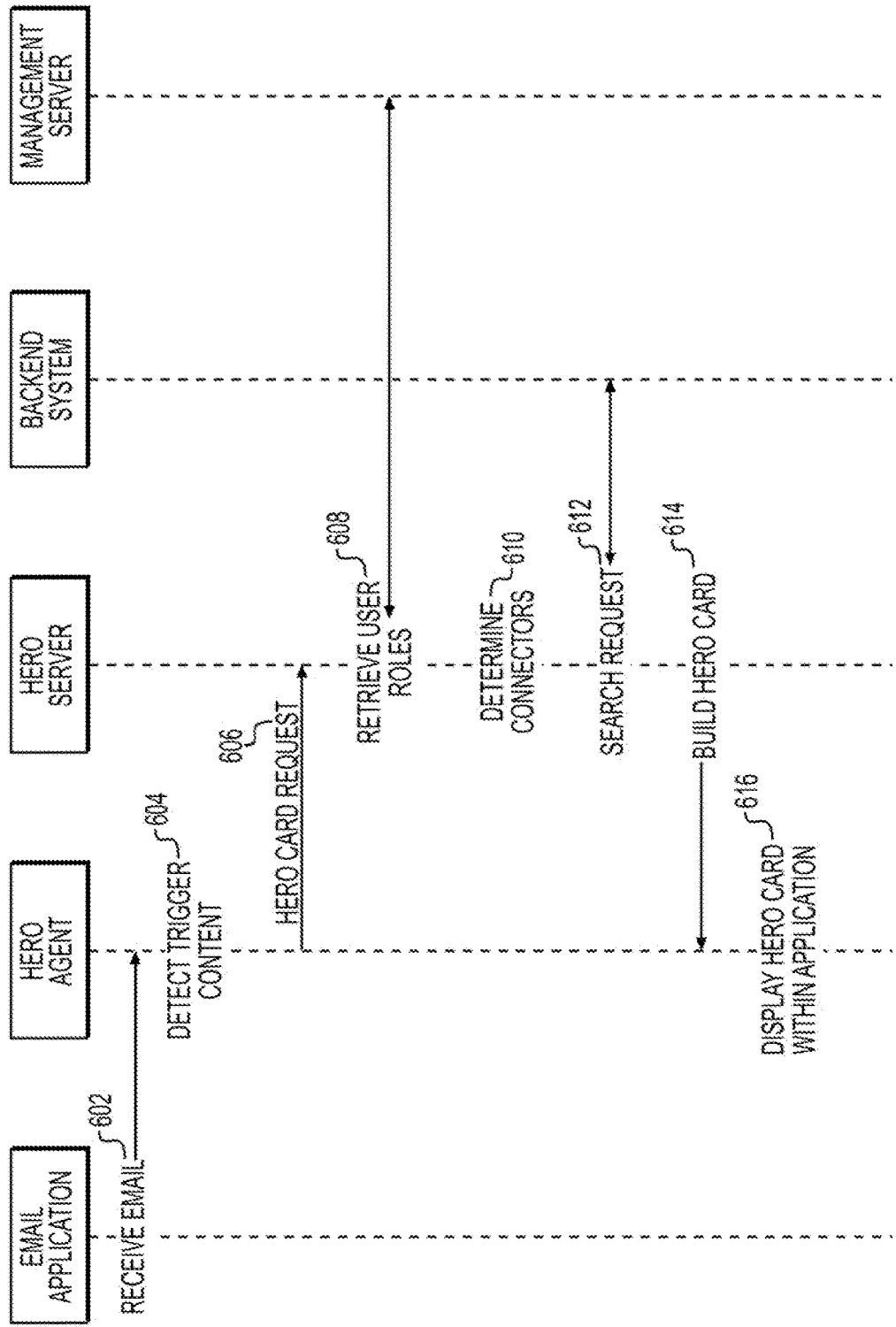
FIG. 6 is a sequence diagram of an example method for customizing action options in hero cards.
Figure 7:
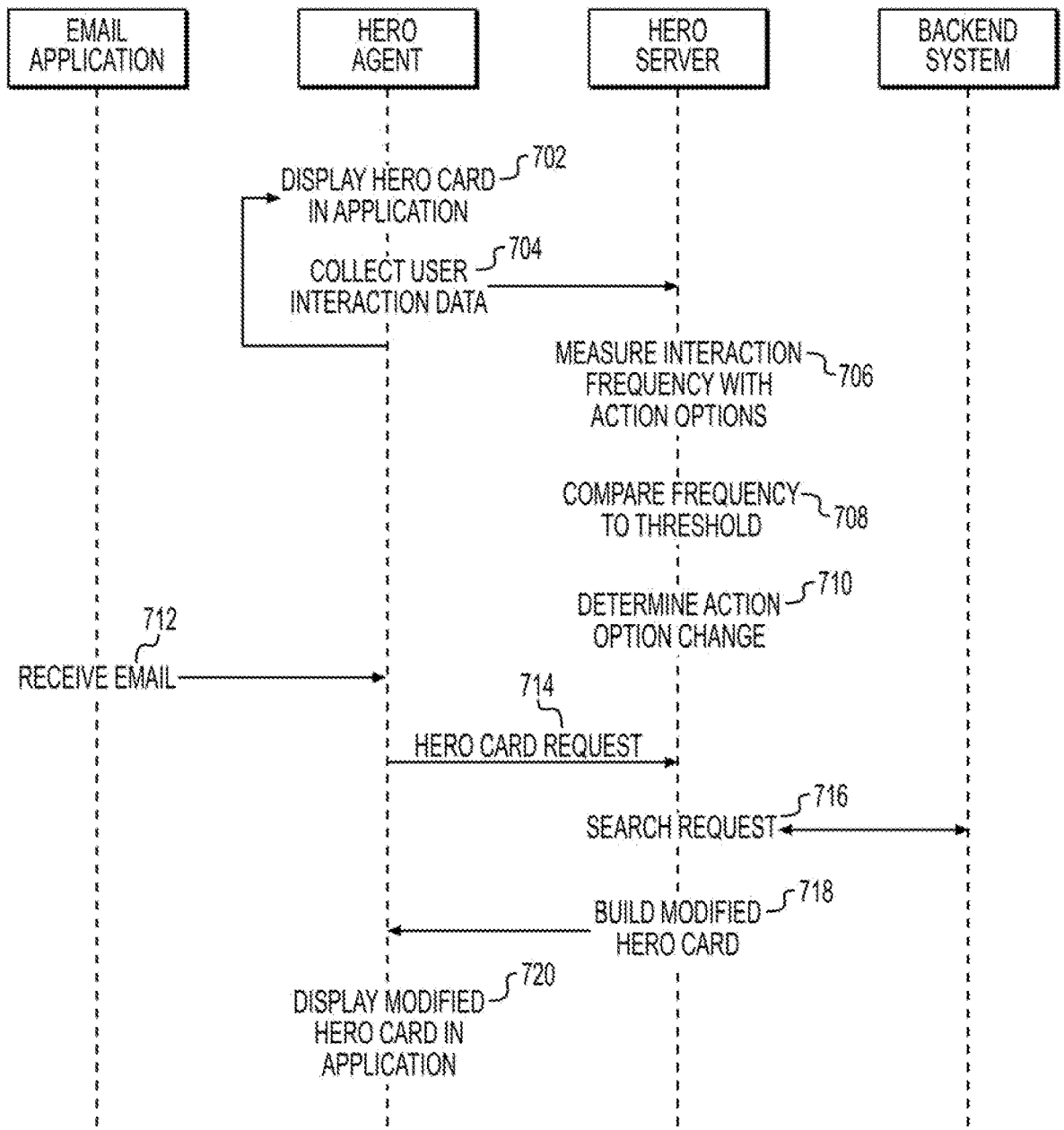
FIG. 7 is another sequence diagram of an example method for customizing action options in hero cards.
Figure 8:
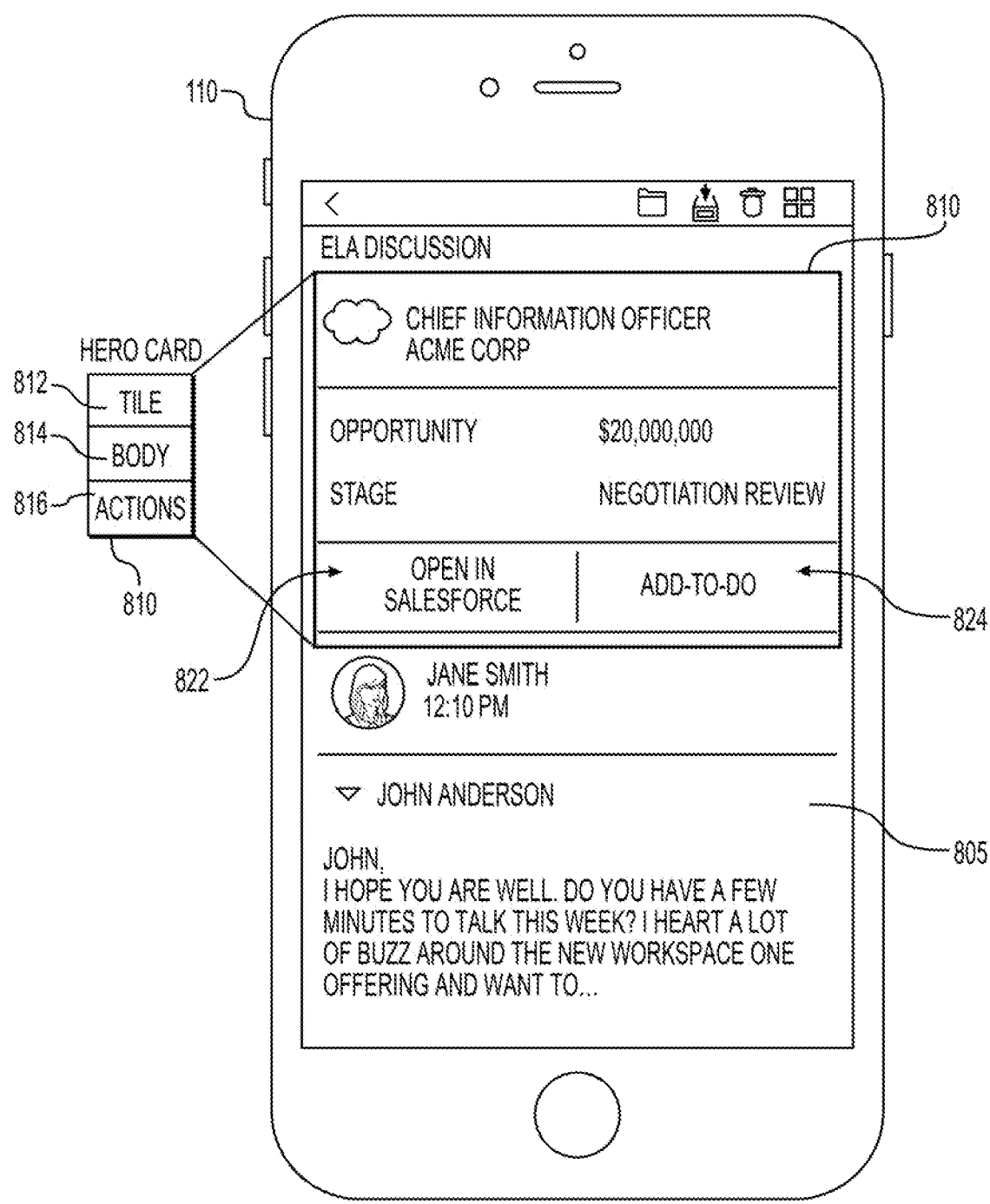
FIG. 8 is an illustration of an example GUI that can be used for intelligently managing hero cards.

FIG. 1 illustrates an example system for providing and intelligently managing hero cards. FIG. 2 illustrates an example method of creating hero cards. FIG. 3 illustrates an example method for enabling creation of a new hero card type for a user profile based on user interactions with an application. An email application is used to describe the method of FIG. 3, however any application that a user can interact with can be used. FIG. 4 illustrates an example method for managing action options presented to a user based on the user's interactions with hero cards, action options, and applications. FIG. 5 is a sequence diagram for intelligently managing which hero cards are presented to a user. FIG. 6 is a sequence diagram for intelligently managing action options presented in hero cards for a user based on the user's role. FIG. 7 is a sequence diagram for intelligently managing action options presented in hero cards for a user based on a user's interactions with hero cards, action options, and application. FIG. 8 is an example GUI of a hero card.

FIG. 1 illustrates an example system for providing and intelligently managing hero cards in an application. A user device 110 can be any processor-based computing device, such as a smartphone, laptop, tablet, personal computer, or workstation. A user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others.

The user device 110 can execute applications 115. As will be described, a hero agent 112 can execute on the user device 110 to measure user interactions with the applications 115 and dynamically determine when to present hero cards and which action options to include on those cards.

Some of the applications 115 can be managed applications with functionality that can be controlled by a management server. The management server can be the illustrated hero server 120 or a separate server. An administrator can configure functionality and access restrictions for particular users or groups of users at the management server. Then the management server can control file access and device functionality of the user device 110 accordingly. For example, the management server can turn off functionality at the user device 110, such as printing, emailing, or Internet access. Additionally, a content application 118 on a first user device can be configured to allow access to a first repository but not a second, whereas a second user device can be configured to access the second repository. These access and functionality settings can be stored in profiles that the management server links to users or user devices.

The management server can control the managed applications through interaction with a management agent that can execute on the user device 110. The management agent can be an application 115 or part of an operating system, and it can enable or disable functionality on the user device 110. The hero agent 112 can be part of the management agent. The management agent can be installed when the user device 110 enrolls with the management server, in one example. The management server can be part of a unified enterprise management ("UEM") system. The management server can dictate which managed applications are installed, such as based on which user group a user belongs to. Similarly, specific functionality within the managed applications can be enabled or disabled by the management server, and can vary per user or user group.

Managed applications can allow a user to communicate on an enterprise network with the hero server 120 to securely access files. This can allow a user to use their own user device 110, such as a cell phone, in a work environment while limiting access to work files (for example, by providing file access only to the managed applications). In one example, the hero agent 112 is part of a management agent. The hero server 130 can also be part of a management server. However, the hero agent 112 can be provided separately from UEM management and can work agnostically with regard to managed and unmanaged applications. A management server need not be provided in all examples.

In the illustrated example, the hero application 114, email application 116, and content application 118 are all configured to operate with the hero agent 112. The hero application 114 can be a stand-alone application for viewing hero cards. For example, a user can browse cards that have been created based on trigger content detected by the hero agent 112 or hero server 120. The email application 116 can include a location in its GUI for displaying hero cards.

Trigger content for determining when to build and present hero cards can dynamically vary based on which sorts of items and prior cards the user has interacted with. For example, incoming and outgoing emails can act as trigger content for building hero cards. The content application 118 similarly can trigger hero card creation based on the documents being searched, viewed, or created in the content application 118. Although emails received at the email application 116 are described throughout as content for generating hero cards, other content and applications can be used, such as the content application 118.

Backend systems 130 can operate separately from the applications 115. The backend systems 130 can provide services that a user is authorized to use. These can be third-party services or can be internal to the enterprise. But because they operate separately from applications 115, they can maintain their own databases and not share information with applications 115. The hero server 120 can connect related information from these disparate sources. The terms "backend system," "backend server," and "backend database" are used interchangeably for convenience. A backend system 130 can include one or more servers and one or more databases. Similarly, a backend server 143 or backend database 130 can include one or more servers or databases.

The hero agent 112 can include a device-level component, such as an application programming interface (an "API"), agent application, hypervisor, or virtualized device; and an application-level component, such as an API, software development kit ("SDK"), application wrapper, or workspace agent application. The device-level management agent can include system level privileges. The application-level management agent can include privileges in managed applications 115, which can be developed for operation with the hero server 120. Reference to the hero agent 112 is understood to include either or both of the device-level and application-level components unless otherwise specified.

The hero server 120 can interact with the hero agent 112 with calls to an application (e.g., application level) or the operating system (e.g., device level) of a user device 110. In one example, the hero server 120 can send messages to the hero agent 112 and call subroutines in the hero agent 112. In addition, the hero server 120 or a management server can uninstall the hero agent 112 or associated applications 115, such as the hero application 114. This can be done, for example, if the user device 110 is lost or if an employee leaves the job. It can also be done if the user device 110 falls out of compliance with enterprise compliance rules.

In one example, the hero agent 112 can execute on the user device 110. The hero agent 112 can be a plugin or an application that is installed on the user device 110. In one example, it is installed based on instructions from a management server or the hero server 120.

The hero agent 112 can run persistently on the user device 110, periodically checking for incoming content based in various applications 115. Trigger content can be any content that meets criteria for requesting a hero card. Trigger content can be defined by templates in one example. The hero agent 112 can download target templates from the hero server 120 that determine what indicators in content the hero agent 112 looks for. When the indicators are met, the content is considered trigger content. It causes the hero agent 112 to request a hero card from the hero server 120.

The hero agent 112 can check for trigger content based on hooks in the applications 115 in one example. Hooks can be placeholders in the application that allow for additional programming for synching with the hero agent 112. Alternatively, hooks can be API procedures that are implemented by the hero agent 112, to achieve communication with the applications 115.

In one example, the hero server 120 can check for trigger content as an alternative or in addition to the hero agent 112. For example, email from an email server 140 can be routed to pass through the hero server 130. In one example, this can allow the hero server 120 to prepare a hero card prior to the email reaching the user device 110. Another server, such as email server 140 can also check for trigger content. In one example, the hero agent 112 executes on the email server 140 and communicates with the hero server 120 when a trigger is detected. However, the hero server 120 can need user credentials to access information in backend systems 130 relating to the user. In one example, the hero server 120 can wait for the user to login to the user device 110 and communicate with the hero server 120 before receiving the credentials needed to authenticate and query at the backend systems 130. This can allow the system to provide contextual information based on messages at the email server 140.

The hero server 120 can be located remotely from the user device 110. The user device 110 can communicate with the hero server 120 over a network using one or more modulators, demodulators, multiplexers, demultiplexers, network communication devices, wireless devices, antennas, modems, and any other type of device configured to enable data communication through a communication network. The network over which files are sent and retrieved can be an enterprise network in one example. The network can include the Internet, a local area network, or any other suitable communication platform. The user device 110 can communicate over the network using one or more modulators, demodulators, multiplexers, demultiplexers, network communication devices, wireless devices, antennas, modems, and any other type of device configured to enable data communication through a communication network.

The hero server 120 can store information needed for using attributes of trigger content to find related information in the backend systems. For example, it can store connectors, which can include code for connecting to backend systems 130. It can also store service requests in relation to the connectors. One or more stored service requests can match triggering content to a data model for a backend service 130.

When a match exists, the hero agent 112 can receive a hero card from the hero card server 130. The hero card can display within an application, such as email application 116, and can include information specific to one or more backend services 130 that are not part of the application within which the hero card displays. The hero card can be a JSON message that the hero application 120 uses to construct an area within a GUI of the email application.

In addition to matching keywords in backend queries, the hero server 120 can also implement tag-based service requests, in one example. This can involve comparing tags from trigger content, such as a calendar event, to tags in backend systems 130. The hero agent 112 or hero server 120 can automatically extract tags that have been applied to documents, such as emails, word processing documents, drawings, and notes. Example tags can include document authors, senders, recipients, and editors. Other tags can include a title, keywords, a location, or a date. Each content type can have particular types of tags. For example, a calendar invitation can include tags that represent a sender, the recipients, and the location of a meeting. Additional tags can be gathered from any attachments to the corresponding meeting invite.

Tags can be assigned to link common documents, users, or recurring meetings. For example, different document versions can include a common document tag. Recurring or rescheduled meetings can include a common meeting tag. Emails that are part of a thread can similarly include a common tag. In this way, a single content item or meeting event can include many tags. The management agent or management server can automatically determine and apply tags for different documents, such as emails, word processing documents, drawings, and notes. Example tags can include document authors, senders, recipients, and editors. Other tags can include a title, keywords, a location, or a date. Tags can be assigned to link common documents or recurring meetings.

Tags can be used to identify trigger content in one example. A template that defines trigger content can specify which tags to analyze or provide to the backend. As an example, a meeting tag in an email can cause the hero agent 112 to identify the email as trigger content. The meeting information can be used to build a hero card based on relevant information in a backend system 130. For example, the backend systems 130 can have their own separate calendars associated with the user, or date-stamped tasks that could be relevant to the meeting.

Therefore, tags can also be used for searching backend systems 130. As an example, the hero server 120 can use tags gathered from a meeting event and attached files as inputs for a service request to one or more backend systems 130. For example, the hero agent 112 can send a service request after triggering based on detecting a tag combination in an email sent to email application 116. The tags can include start date, end date, sender user, and recipient users, in one example.

The hero server 120 can use the tags to query a backend system 130 based on one or more connectors associated with the user device 110. The backend system 130 can use similar tags, or the service request can translate tag inputs into data and structures that exist in the data model of the backed system 130. Related items can be returned as result information to the hero server 120. The hero server 120 can pass some or all of the result information back to the hero agent 112, for example, in a JSON message. The hero agent 112 can render a hero card in the email application 116 from the JSON message.

The hero agent 112 can interface similarly with other applications 115, such as content application 118. Documents within the content application 118 can trigger the creation of hero card. The system can use keywords, authors, and tags within the documents to implement service requests at the hero server 120. The hero agent 112 can similarly interface with other applications 115, such as a notes application, One Drive, or even a standalone hero card viewer 114.

The hero agent 112 can collect data on how a user interacts with the applications 115 on the user device 110. For example, the hero agent 112 can log when a user opens the email application 116, when the user opens an email, details about the email, whether the email contains a link associated with another application, whether the user selects the link, and more. The hero agent 112 can also collect user interaction data of user interactions with hero cards presented on the user device 110. For example, the hero agent can log what hero cards are displayed to the user, when the user interacts with a hero card, and when the user interacts with an action option on the hero card. Action options can be interactive elements in a hero card that allow a user to perform an action at a backend system 130 from within the hero card. In an example, the hero agent 112 can send this data to the hero server 120.

The hero server 120 can use the user interaction data to predict user behavior and determine which hero cards and action options to present to the user. For example, the hero server 120 can identify which hero card types the user tends to interact with the most, and the hero server 120 can generate hero cards for those hero card types for displaying on the user device 110. For example, to reduce clutter the hero server 120 can generate hero cards for the top 5 hero card types that the user interacts with, or for the hero card types the user interacts above a threshold frequency. In one example, the hero server 120 can instruct the hero agent 112 to prioritize hero cards that are time sensitive. For example, the data for which a hero card is based on indicates that a deadline is approaching, or that a matter associated with the hero card has not been addressed after a predetermined period of time, the hero server 120 can instruct the hero agent 112 to present the corresponding hero card at the top of the display of hero cards.

In an example, the hero server 120 can dynamically enable and disable hero card creation of hero card types for a user based on how frequently the user interacts with the hero cards. The hero server 120 can also do this for action options on hero cards. For example, the hero server 120 can add, remove, or replace action options on hero cards based on whether and how frequently the user interacts with the action option type. In one example, the hero server 120 can dynamically adjust hero cards and action options according to the time of day based on when the user tends to interact the most with each hero card type and action option type.

In an example, the hero server 120 can retrieve user interaction data from the backend systems 130 about how the user interacts with a corresponding application. For example, the hero server 120 can communicate with a backend system 130 of the content application 118 to determine what actions the user performs most frequently in the content application 118 across multiple devices. The hero server 120 can analyze that interaction data to determine what action options would be most useful to include in hero cards for the content application 118 for the user.

In an example, the hero server 120 can provide or replace action options based on a user's role. For example, the hero server 120 can analyze user interaction behavior with action options of users that belong to a same group of the user, such as management, marketing, or development group. The hero server 120 can identify action options that users of the same group interact with the most frequently and begin creating hero cards for the user with those action options.

In one example, the hero server 120 can create hero cards or include action options based on the state of an item. For example, if a trouble ticket is in "solved" state, then the hero server 120 can create or modify hero cards for that trouble ticket so that they do not include a "solved" action option. In another example, the hero server 120 can add, remove, or change hero cards presented to a user based on the state of the associated matter. As an example, a trouble ticket of a UEM system can require all tickets reassigned from a help desk employee to an engineer first be reviewed by a supervisor. A help desk user uses a "reassign" action option on a hero card to reassign the ticket to an engineering group. The hero server 120 can generate a hero card for the ticket on a corresponding help desk supervisor's user device with action options for confirming or rejecting the reassignment. Where the supervisor selects to reject the reassignment, the hero server 120 can place the hero card for the ticket back on the help desk user's device. Where the supervisor selects the action option for confirming the reassignment, the hero server can generate a hero card for the trouble ticket and send it to hero agents 112 on user devices 110 for engineers in the corresponding group. The engineering hero cards can include action options relevant to the engineering group.

The system can include an ML server 150. The ML server 150 can host an ML training service 152. The ML training service 152 can train models to measure user interactions with hero cards, applications 115, and backend systems 130. For example, trained ML models can create parameters for user hero cards based on how frequently and in what way a user interacts with hero cards in the hero application 114, emails in the email application 116, and the content application 118. In one example, the ML training service 152 can receive user data from the backend systems to determine what actions users perform in those systems and how frequently. The ML training service 152 can train the model to create parameters based on the user behavior in the backend systems. In one example, the ML training service 152 can also retrieve groups that a user belongs to from the directory service 160 and create parameters for hero cards based on the users' roles. The ML server 150 can send the ML model to the hero server 120, and the ML model can apply the ML model to create parameters for creating each user's hero cards. In one example, the hero server 120 can also query the directory service 160 to determine a user's roles to determine what action options on a hero card are most applicable to a user. Action options can be interactive elements in a hero card that allow a user to perform an action at the backend system 130 from within the hero card.

FIG. 2 is a flowchart of an example method for creating hero cards. At stage 210, the hero agent 112 can be installed on the user device 110. The hero agent 112 can be installed as part of an application, such as the email application 116, or separate from an application that will utilize the hero agent 112. The hero agent 112 can be a background process, or can be its own stand-alone application, in an example. The hero agent 112 can cause the user device 110 to communicate with the hero server 120 to retrieve contextual information. The contextual information can relate to content received in the content application 118 that executes on the user device 110. In one example, the hero agent 112 can communicate with the content application 118 through API procedure calls between the content application 124 and the hero agent 112.

At stage 220, the hero server 120 can receive a service request from the hero agent 112. The service request can be sent in response to the detection of trigger content within an application, such as the email application 116 or the content application 118. Trigger content can be any content that the hero agent 112 recognizes as having an attribute that is useable at the hero server 120 for finding related information in backend systems 130. The service request can include an authentication credential, such as a token, that allows the hero server 120 to validate the user and the request.

The hero server 120 can utilize the service request to identify contextual information for use in at least one hero card. The contextual information can include related information from outside of the application associated with the triggering event. For example, if an email application triggers the service request, the contextual information can come from backend systems 130 that the email application does not otherwise communicate with.

Identifying a group associated with the user, such as a tenant, can allow the hero server 120 to determine which backend systems 130 to connect with. At stage 230, the hero server 120 can dynamically determine which connectors apply to the user device based on user interactions. The backend system 130 can be one or more servers or databases used by one or more other applications. The hero server 120 can create a relational bridge between these different systems. When a certain event occurs, such as the email application 116 receiving an email with trigger content, the hero server 120 can identify connectors for the backend system 130 that corresponds to the event.

The hero server 120 can dynamically determine which connectors apply by collecting and analyzing user interaction data. As an example, the hero server 120 can collect data of user interactions with the applications 115. For example, the hero server 120 can collect data on which emails a user interacts, which email links the user selects, how often the user interacts with hero cards of each hero card type, how frequently the user interacts with action options on hero cards, and what actions the user frequently performs in the content application 118. The hero server 120 can analyze the user interaction data to dynamically determine for which emails and application events a hero card should be generated. For example, the hero server 120 can enable or disable hero card generation for events or trigger content based on the user's interactions. The hero server 120 can identify connectors that link the trigger event to its corresponding data or component in the related backend system 130. In an example, the connectors can be stored in a table, such as a relational data table. When a trigger event or content is detected, the hero server 120 can look up the corresponding connectors in the data table.

At stage 240, the hero server 120 can perform a search at the identified backend system 130 based on metadata from the target event or content. This can include requesting data associated with the first connector, the request relating an aspect of the trigger content to a first backend system having a first data model. In response to the service request, the hero server 120 can receive result information from the first backend system.

At stage 250, the hero server 120 can generate a hero card with custom action items. For example, the hero card can include a data structure for formatting the different information for display. The data structure can include different regions, such as for icons, information, and action buttons. The hero server 120 can determine which action buttons to include based on the user interaction data. For example, the hero server 120 can analyze user interactions with the applications 115 and action options on hero cards to dynamically determine which action options the user would find most useful. In one example, this can include creating new action options. In another example, this can include analyzing the user interaction behavior to identify action options frequently utilized by users of the same group as the user. For example, if users of a management group in an organization frequently utilize a "resolve" action option that resolves an issue associated with a hero card, the hero server 120 can use that information to introduce a "resolve" action option for the user and measure how frequently the user utilizes it. In one example, the hero server 120 can introduce an action option on a trial basis to determine whether the new action option is useful for the user. The hero server 120 can add, remove, and exchange action options on hero cards for users based on their behavior so that each user receives customized hero cards with action options tailored to them individually.

At stage 260, the hero server 120 can send the hero card to the hero agent 112, causing the user device to display the hero card within the hero application 114. The hero application 114 can graphically format the information based on reading the hero card data structure and implementing the display of the hero card within the hero application 114. The application can choose to minimize or abbreviate portions of the hero card based on available screen space. For example, some regions can be hidden, minimized, or maximized, depending on the application. A hero plugin can execute within the application to assist with managing the display of hero cards within the hero application 114.

Although the examples described involve a hero agent 112 contacting a hero card server 120 with metadata used to identify and build hero cards, in another example, the content for a hero card can be provided along with the email. In this example, a server, such as a separate email server, the hero server 120, or a MICROSOFT EXCHANGE SERVER, can identify metadata for incoming messages and determine the content for hero cards prior to or concurrent with delivery of the email to the email application 116. In addition, although illustrated as a separate server, the hero server 120 can be part of the email server 140 or integrated with the email server 140. Similar functionality described with respect to the hero agent 112 can be implemented at the hero server 120. The hero server 120 can implement templates to identify trigger content. The hero server 120 can then check backend systems 130 that are resident at the hero server 120 or remote from the hero server 120. The hero server 120 can do so by communicating with connectors that are part of the hero server 120 or external from the hero server 120. The connectors can dictate service requests for interacting with the backend systems 130.

FIG. 3 is a flowchart of an example method for intelligently managing hero cards. At stage 310, the hero server 120 can determine an amount of emails of an email type received by an email account. For example, the email application 116 can be configured to report new emails to the hero agent 112. In an example, hero agent 112 can analyze the content and metadata of new emails. Example metadata can include the sender, the recipient, the subject, the content type, and keywords within the email's content.

In one example, the hero agent 112 can check incoming emails on the user device 110 for trigger content. Trigger content can be any content that meets criteria for requesting a hero card. Trigger content can be defined by templates in one example. The hero agent 112 can download target templates from the hero server 120 that determine what indicators in content the hero agent 112 looks for. When the indicators are met, the content is considered trigger content. It can cause the hero agent 112 to send a service request to the hero server 120 so that a hero card can be created based on the new email.

In an instance where indicators are not met, the hero agent 112 can save information about the email, such as the metadata and content. In one example, the hero agent 112 can use the email information to determine an email type. Email types can be used to group emails together for creating hero cards and for determining their format and content. Example email types can include emails from the same sender, scheduling emails, and task emails. In an example, where the email application 116 receives an email that does not include trigger content for creating a hero card, the hero agent 112 can save information about the email, including the email's type. In one example, the hero agent 112 can send the email information to the hero server 120. In another example, the hero server 120 can apply tags to the email information. The tags can be used to identify related emails received at the email application 116. For example, the hero server 120 can use the tags to identify emails from the same sender, with links directed to the same domain, or related to the same event. A link can be an object with an associated Uniform Resource Locator ("URL") that, when selected, redirects the user to a web page or application. The tags can help determine the email's type for purposes of analyzing user interactions, as described below.

At stage 320, the hero server 120 can determine a frequency of user interactions with emails of the email type. In an example, when an email is received, the hero agent 112 can determine the email's type and whether it has trigger content. In an instance where the email does not include trigger content, the hero agent 112 can record when and how the user interacts with the email. Some example user interactions can include viewing the email, deleting the email, replying to the email, and selecting a link in the email that redirects the user to a web site or application. The hero agent 112 can report the user interactions to the hero server 120. The hero server 120 can analyze how frequently the user interacts with emails of the email type.

In one example, the user interaction analysis can include calculating an interaction score. The hero server 120 can increase or decrease the score based on how the user interacts with emails of the email type. In one example, interaction types can be assigned a weighted number. For example, the hero server 120 can increase the interaction score by predetermined amounts if the user performs actions that favor creating hero cards for the email type, such as viewing an email or selecting a link in an email. The hero server 120 can also decrease the interaction score by predetermined amounts if the user performs actions that disfavor creating hero cards for the email type, such as deleting an email without viewing it or not selecting a link in the email. In one example, the hero server 120 can apply a multiplier to the interaction score based on how frequently the email application 116 receives emails of the email type. In another example, interaction scores and frequency weights can be set by an administrator.

At stage 330, in an instance where the user interaction frequency exceeds a first threshold, the hero server 120 can enable generation of hero cards for emails of the email type received by the email account. For example, the hero server 120 can compare the user interaction score to a predetermined threshold. In one example, the threshold can be set by an administrator.

In an example, enabling generation of hero cards for emails of the email type can include creating a rule for the email type. For example, the hero server 120 can create a rule that determines when a hero card should be created for emails of the email type received. In one example, the rule can indicate that a hero card should be created for any email of the email type received. In another example, the rule can indicate certain trigger content that the hero agent 112 should look for in the new email, such as a link or certain keywords. The hero server 120 can send the rule to the hero agent 112, and the hero agent 112 can apply the rule for all new emails of the email type.

In an example, when the email application 116 receives an email of the email type, hero agent 112 can identify the email type and apply its corresponding rule to determine whether to request a hero card. This can include analyzing the new email for trigger content identified in the rule. Where the email contains trigger content, the hero agent 112 can send a request for a hero card to the hero server 120. The hero server 120 can proceed to generate a hero card for the email. In one example, the hero server 120 can generate the hero card using the stages described above in FIG. 2.

In one example, the hero card server 120 can analyze the user interaction behavior to provide insights to administrators for which applications need to be integrated with the hero server 150. For example, the hero server 120 can determine that numerous users in an organization click on links in emails that cause their respective user devices 110 to open a computer-aided design ("CAD") application that is not integrated with the hero server 120. In one example, this determination can be based on a threshold rate of interactions from users with emails that open the CAD application. The hero server 120 can notify an administrator and make the user interaction data available to the administrator. The administrator can then determine whether to integrate the CAD application with the hero server 120 so that the hero server 120 can generate hero cards for trigger content or events associated with the CAD application.

In an example of the above-described method, the hero server 120 can measure the number of different types of emails received from 3rd party systems like SALES FORCE and SERVICE NOW in a certain time period. The hero server 120 can measure the frequency of such emails acted on by the user within the same time period. The hero server 120 can compare the user interaction frequency to a predetermined threshold. Where the user interaction frequency exceeds the threshold of the time period, the hero server 120 can enable generation of hero cards for future emails of the email type. When future emails of the email type are received, the hero server 120 can execute stages for creating a hero card for the email.

In an example, the method described in FIG. 3 can be implemented using an ML model. In one example, the ML model can be hosted on the ML server 150 and trained by the ML training service 152. The ML model can use a parameter to measure the anticipated usage of hero cards for each user. This parameter can be the ratio of the number of type of emails received by the user in a defined time period to the different type of emails clicked on by the user to navigate out of the email application 116 to browse the content in a WebView, browser, or related app within the same time period. This can indicate the true picture of the user's actionable interest in each type of available hero card. The hero server 120 can apply the ML model to count the number of times the user clicks out of the email within measured time periods. Where the number of licks in the measured time period reaches/exceeds a threshold limit, the hero server 120 can enable hero card generation for the email. The hero server 120 can continue to apply the ML model to enable and disable hero card generation for each user based on the user's behavior.

FIG. 4 is a flowchart of another example method for intelligently managing hero cards. At stage 410, the hero server 120 can create a set of hero cards for a user profile that include action options. In an example, action options can be interactive elements in a hero card that allow a user to perform an action at the backend system 130 from within the hero card. In one example, when creating a hero card, the hero server 120 can determine whether trigger content relates to any actions or information in the backend systems 130 associated with the user. Therefore, from within the unassociated application, the user can perform actions in the backend systems 130 and understand how the trigger content relates to those backend systems 130.

In an example, assembling a hero card can include creating a JSON message that can be interpreted by the hero agent 112. The JSON message can include the result information from the first backend system 130. For example, the result information can notify the user of information in the backend system 130 that relates to the trigger content. Additionally, the result information can include actions to take in the backend system 130 that relate to the trigger content. The actions can be interpreted by the hero agent 112 to provide buttons on the hero card. While a JSON message is one example, any other message format is possible, such as XML.

The hero server 120 can send the assembled hero card to the hero agent 112 on the user device 110. Because the hero agent 112 can be integrated with the email application 116, it can also cause the email application 116 to display the hero card. This effectively allows presentation of backend system information or actions within the unassociated application with the related trigger content.

In one example, the action options included on a hero card can be based on one or more groups that the user belongs to. A user's role can play a big part in the action options a user would likely utilize. For example, a quality engineer is more likely to add comments on a JIRA bug he is tagged in rather than resolve or re-assign the issue, a manager is more likely to re-assign or resolve an issue, and a developer is more likely to resolve or comment on an issue. The hero server 120 can use enterprise roles as a factor in deciding the action options displayed in hero cards. Users in an enterprise can therefore receive hero cards with customized action options that correspond to their roles.

At stage 420, the hero card server 120 can receive data of user interactions with the action options. In an example, the user interaction data can be received from the hero agent 112. For example, the hero agent 112 can collect data on user interactions with hero cards in the hero application 112. For example, the hero agent 112 can collect data on which hero cards are presented to the user, when and how often the hero cards of each type are presented, what action options are included in each hero card, and how often the user interacts with each type of action option. In an example, the hero agent 112 can send this data to the hero server 120.

At stage 430, the hero server 120 can measure the frequency that the user interacts with one of the action options. For example, the hero server 120 can count the number of times a user does or does not interact with an action option over a given time period. In one example, the hero server 120 can determine the frequency as a ratio based on how many times the action option is presented to the user versus how many times the user interacts with the action option. For example, the hero server 120 can determine the percentage of hero cards presented to the user in which the user interacts with the action option.

In one example, in determining the user interaction frequency, the hero server 120 can consider the whether the user interacts with the hero cards in another way. For example, the hero server 120 can ignore hero cards where the user does not interact with the hero card at all. In another example, the hero server 120 can compare the rate that a user interacts with the action option on a hero card type to the rate that the user interacts with other action options presented on the hero card type.

In another example, the hero server 120 can analyze action options across multiple hero cards types. For example, hero cards for SALESFORCE, JIRA, and CONCUR created for a user can all include an action option to leave a comment. In one example, the hero server 120 can measure the frequency in which the user interacts with the comment action option across all hero card types that include a comments action option. In another example, the hero card 120 can measure the user interaction frequency of the comment action option on each hero card type separately.

At stage 440, in an instance where the user interaction frequency with the action option drop below a threshold, the hero server 120 can modify a parameter to replace the action option with a different action option. This can help customize hero cards for a user so that the user is presented with action options that are most useful to the user. In one example, the replacement action option can be chosen based on the user's role. In another example, the replacement action option can be chosen based on the user's interactions with other hero cards. In still another example, the hero server 120 can choose a replacement action option based on user interaction rates of other users in the user's group with other action options.

In an example of replacing an action option, the hero server 120 can determine that a user interacts with a comment action option for a particular hero card type 70% of the time, but interacts with a resolve option only 5% of the time. The hero server 120 can compare the 5% interaction rate with a threshold rate, which is 15%. Because the interaction rate of the resolve option is below 15%, the hero agent 120 can determine a replacement action option for the hero card type for the user. In one example, the hero server 120 can analyze user interaction rates of other users in the same group for the hero card type and determine that other users utilize a re-assign option 30% of the time. The hero server 120 can change hero card creation rules for hero cards of the hero card type for the user so that new hero cards of the type include a re-assign action option.

In an example of the method described above, the hero server 120 can determine the user interaction frequency by receiving data from a backend system associated with the hero card type. For example, integrated third-party software can provide either high-level numerical or percentile statistics based on actions performed by a user on their systems. In one example, when a user interacts with a hero card, the hero server 120 can utilize a Single Sign-On ("SSO") to access the backend system 130 and execute the user's action. The SSO can include a credential that identifies the user so that the third-party software knows what actions are being performed by which users. In another example, the third-party software can track actions performed by a user within their system and provide user action statistics to the hero server 120. The hero server 120 can utilize this data to distill a subset of action options which are most used by an individual user or by a category of users.

In another example, of the method described above, the hero server 120 can derive user interaction data via an automated email notification system. For example, the third-party software can be configured to send an automated email when a user performs a state change in the associated backend system 130. The hero server 120 can have access to the status change emails, and it can use information in the emails to determine the rate at which the user performs various actions in the backend system 130. The hero server 120 can use this data to determine which action options may be most useful to users. In an example, the hero server 120 can use this data in combination with other methods described above, such as third-party usage data and direct analysis of user interactions with hero card action options.

In an example, the method described in FIG. 4 can be implemented using an ML model. In one example, the ML model can be hosted on the ML server 150 and trained by the ML training service 152. The ML model can retrieve and analyze various pieces of information to determine a tailored set of action options for each user. In an example, the ML model can create parameters specific to each user based on the users' behaviors and roles. In an example, the ML model can retrieve user roles from the directory service 160. For example, the ML model can receive user interaction data based on user interactions with emails and hero cards at the user device 110 and user interaction data from backend systems 130. The ML model can measure how frequently each user performs each available action in the emails, hero cards, and backend systems. The ML model can also measure patterns of user behavior based on user groups, such as by determining which actions members of a group perform the most frequently. The ML model can provide this data to the hero server 120, and the hero server 120 can use the data to determine which action options to include on hero cards for each hero card type and for each user.

FIG. 5 is a sequence diagram of an example method for intelligently managing hero cards. At stage 502, the email application 116 can receive an email. For example, the email application 116 can be configured to receive emails for an email account of a user. In an example, the user can have previously logged into the email application 116 using credentials for the email account, and the email server 140 can be an email exchange server for the domain of the email address. When an email is sent to the email address, the email server 140 can receive it and send it to the email application 116.

At stage 504, the hero agent 112 can collect data of user interactions with the email. Examples of user interactions can include viewing the email, deleting the email, replying to the email, and selecting a link in the email that redirects the user to a web site or application. Other user interactions can be based on which applications the user is launching or installing. For example, if the user installs and commonly opens and application referenced in an email, then that activity can be relevant to whether a hero card should display for that email type. Therefore, the hero agent can report application usage for use in determining whether to enable hero cards for email types that reference those applications. If the application usage exceeds a threshold frequency, the email type can be enabled for hero cards.

In an example, the user interaction data can include data from the email itself. Such email data can include metadata or content from the email, such as keywords or links. In an example, as shown in FIG. 5, the hero agent 112 can continuously collect data for emails received at the email application 116 and send the data to the hero server 120.

In one example, the hero agent 112 can also determine the email's type and whether the email contains any trigger content. Where the email contains trigger content for a hero card type, the hero agent 112 can send a request for a hero card to the hero server 120. Where the email does not contain trigger content, or where hero card generation is not enabled for the email type, the hero agent 112 can send user interaction data to the hero server 120 to analyze whether hero cards should be created for the email type.

At stage 506, the hero agent 112 can send the user interaction data to the hero server 120. In an example, the hero agent 112 can send the user interaction data as a data file, such as an extensible markup language ("XML") or JavaScript Object Notation ("JSON") file. The hero agent 112 can send the data file over a network, which can be an internal network, but can also be over the Internet. For example, the hero agent 112 can send the data file as an API call or an Internet protocol, such as hypertext transfer protocol ("HTTP"), simple object access protocol ("SOAP"), representational state transfer ("REST"), and/or other protocols.

At stage 508, the hero server 120 can analyze the user interaction data. In one example, this can include calculating an interaction score. The hero server 120 can increase or decrease the score based on how the user interacts with emails of the email type. In one example, interaction types can be assigned a weighted number. For example, the hero server 120 can increase the interaction score by predetermined amounts if the user performs actions that favor creating hero cards for the email type, such as viewing an email or selecting a link in an email. The hero server 120 can also decrease the interaction score by predetermined amounts if the user performs actions that disfavor creating hero cards for the email type, such as deleting an email without viewing it or not selecting a link in the email. In one example, the hero server 120 can apply a multiplier to the interaction score based on how frequently the email application 116 receives emails of the email type. In another example, interaction scores and frequency weights can be set by an administrator.

At stage 510, the hero server 120 can determine whether to activate the generation of hero cards for emails of the email type. In one example, this determination can be based on whether the user interaction score exceeds a threshold. In another example, this determination can be based on the frequency in which the user interacts with emails of the email type. For example, the hero server 120 can adjust the interaction score based on how many emails of the email type the user receives over a period of time. In one example, the hero server 120 can require that the email account receive a predetermined minimum number of emails of the email type over a period of time to qualify for hero card creation. In other words, the hero server 120 can require that emails of the email type be received at a certain frequency regardless of the user interaction rate. For example, if a user receives one two emails of an email type in a year and interacts with both of those emails, this may not warrant generating hero cards for the email type because those emails are received so infrequently.

In an example, enabling generation of hero cards for emails of the email type can include creating a rule for the email type. For example, the hero server 120 can create a rule that determines when a hero card should be created for emails of the email type received. In one example, the rule can indicate that a hero card should be created for any email of the email type received. In another example, the rule can indicate trigger content that the hero agent 112 should look for in the new email, such as a link or certain keywords. The hero server 120 can send the rule to the hero agent 112, and the hero agent 112 can apply the rule for all new emails of the email type.

At stage 512, the email application 116 can receive another email of the email type. In one example, incoming emails can be saved at the email server 140. The hero server 120 can have access to the email server 140 and analyze incoming emails to determine their type. In another example, the hero agent 112 can analyze emails received at the email application 116. The hero agent 112 can determine that the email is of the type for which hero card generation was activated at stage 510.

At stage 514, the email application 116 can send metadata of the email to the hero server 120. In an example, the hero agent 112 can send the metadata as a data file, such as an XML or JSON file. The hero agent 112 can send the data file over a network, which can be an internal network, but can also be over the Internet. For example, the hero agent 112 can send the data file as an API call or an Internet protocol, such as HTTP, SOAP, REST, and/or other protocols.

In one example, the hero agent 112 can analyze the email for trigger content and determine that a hero card should be created. The hero agent 112 can send a request for a hero card along with the email metadata. The hero server 120 can receive the request and validate the user. Then, the hero server 120 can determine the connectors associated with the user at stage 516.

Connectors can help the hero server 120 identify the appropriate backend system 130 for the hero card. For example, because user groups (i.e., tenants) can be associated with different backend systems 130, the hero server 120 can also associate them with different sets of connectors. As an example, a first tenant might use SALESFORCE only, whereas a second tenant uses SALESFORCE and CONCUR. The hero server can determine a set of connectors that applies to the user or user device. Then, using the set of connectors, the hero server 120 can access the corresponding backend systems. Each backend system can have a different data model that the connectors are able to communicate with. Based on the applicable connectors, the hero server 120 can perform one or more service requests to the corresponding backend systems 130. The service request can relate aspects of the trigger content to the data model of the backend system 130 for querying purposes.

At stage 518, the hero server 120 can send a search request to the backend systems 130. The search request can include user authentication credentials. The user authentication credentials can be JSON web tokens in an example. The credentials can include a token submitted by the user device at stage 405, or a user ID and password supplied by the user. The search request can further include search parameters specified by a service request, utilizing the metadata.

Based on the results of the search requests, the hero server 120 can build a hero card at stage 520. This can include building a JSON message that can be interpreted by the hero agent 112. Then, at stage 522, the hero application 114 can display the hero card 210.

FIG. 6 is another sequence diagram of an example method for intelligently managing hero cards based on group roles. At stage 602, the email application 116 can receive an email. The email can be associated with a user profile, in an example. At stage 604, the hero agent 112 can analyze the email to determine whether it contains any trigger content. For example, the hero agent 112 can have access to read emails in the email application 116. The hero agent 112 can analyze the metadata and content of the email to determine whether it contains trigger content for creating a hero card. In an example, the hero agent 112 can analyze the emails using rules provided by the hero server 120.

If the hero agent 112 detects trigger content in the email, the hero agent 112 can send a hero card request at stage 606. In an example, the hero agent 112 can also send credential data that the hero server 120 can use to authenticate the user with the backend system 130 associated with the requested hero card.

At stage 608, the hero server 120 can retrieve user roles from the directory service 160. For example, the hero card request can include an identifier for the user's profile. The hero server 120 can query the directory service 160 for any groups that the user's profile belongs to. The hero server 120 can use this information about the user's groups to help determine which action options to include when building the hero card at stage 614 below.

At stage 610, the hero server 120 can determine connectors based on the email. Connectors can help the hero server 120 identify the appropriate backend system 130 for the hero card. For example, because user groups (i.e., tenants) can be associated with different backend systems 130, the hero server 120 can also associate them with different sets of connectors. As an example, a first tenant might use SALESFORCE only, whereas a second tenant uses SALESFORCE and CONCUR. The hero server 120 can determine a set of connectors that applies to the user or user device. Then, using the set of connectors, the hero server 120 can access the corresponding backend systems. Each backend system can have a different data model that the connectors are able to communicate with. Based on the applicable connectors, the hero server 120 can apply one or more service requests to the corresponding backend systems 130. The service request can relate aspects of the trigger content to the data model of the backend system 130 for querying purposes.

At stage 612, the hero server 120 can send a search request to the backend system 130. The search request can include user authentication credentials. The user authentication credentials can be JSON web tokens in an example. The credentials can include a token submitted by the user device at stage 405, or a user ID and password supplied by the user. The search request can further include search parameters specified by a service request, utilizing the metadata.

At stage 614, the hero server 120 can build a hero card. In an example, the hero server 120 can build the hero card based on the search results. In another example, the hero server 120 can include action options in the hero card based on one or more groups the user belongs to. For example, the hero server 120 can include a resolve action option if the user belongs to a management group and a comment option if the user belongs to an engineering group.

At stage 616, the hero agent 112 can cause the hero card to be displayed. For example, the hero server 120 can send the hero card to the hero agent 112. The hero agent can display the hero card in the hero application 114. In one example where the hero application 114 is integrated into the email application 116, the hero agent 112 can display the hero card in the email application 116.

FIG. 7 is another sequence diagram of an example method for intelligently managing action options on hero cards. At stage 702, the hero agent 112 can cause hero cards to be displayed. For example, the hero agent 112 can receive a hero card from the hero server 120 and display it in the hero application 114. At stage 704, the hero agent 112 can collect data on user interactions with the hero card and send the data to the hero server 120. For example, the hero agent 112 can collect data on which hero cards are presented to the user, when and how often the hero cards of each type are presented, what action options are included in each hero card, and how often the user interacts with each type of action option. As shown in FIG. 7, the hero agent 112 can repeat stages 702 and 704. For example, the hero agent 112 can display hero cards as it receives them from the hero server 120, and the hero agent 112 can collect data on user interactions with the hero cards and send the data to the hero server 120.

At stage 706, the hero server 120 can measure the frequency that the user interacts with action options on the hero cards. For example, the hero server 120 can count the number of times a user does or does not interact with an action option over a given time period. In one example, the hero server 120 can determine the frequency as a ratio based on how many times the action option is presented to the user versus how many times the user interacts with the action option. For example, the hero server 120 can determine the percentage of hero cards presented to the user in which the user interacts with the action option.

In one example, the hero server 120 can receive user interaction data from the backend systems 130. For example, one or more backend systems 130 can provide data to the hero server 120 on how the user interacts with their respective system. The hero server 120 can use this data to determine what actions, and how frequently, the user performs actions in those backend systems 130. In one example, the hero server 120 can use this data to determine which action options would be most useful to the user or to create new action options based on user behavior.

At stage 708, the hero server 120 can compare user interaction frequency with a threshold. In one example, the threshold can be set by administrator. In another example, the threshold can be set, or adjusted, by applying an ML model to determine an optimal threshold. At stage 710, the hero server 120 can determine that an action option should be changed for the user. In an example, this determination can be based on the user interaction frequency being below the threshold. In one example, the replacement action option can be chosen based on the user's role. In another example, the replacement action option can be chosen based on the user's interactions with other hero cards. In still another example, the hero server 120 can choose a replacement action option based on user interaction rates of other users in the user's group with other action options.

At stage 712, the email application 116 can receive an email. The email can be accessible by the hero agent 112. For example, the hero agent 112 can analyze the email metadata and content to determine whether the email contains any trigger content. Where the hero agent 112 detects trigger content in the email, the hero agent 112 can send a hero card request at stage 714. In an example, the hero agent 112 can also send credential data that the hero server 120 can use to authenticate the user with the backend system 130 associated with the requested hero card.

At stage 716, the hero server 120 can send a search request to the backend system 130. In an example, the search request can include connectors for the hero card request. Connectors can help the hero server 120 identify the appropriate backend system 130 for the hero card. For example, because user groups (i.e., tenants) can be associated with different backend systems 130, the hero server 120 can also associate them with different sets of connectors.

In an example, the search request can include user authentication credentials. The user authentication credentials can be JSON web tokens in an example. The credentials can include a token submitted by the user device at stage 405, or a user ID and password supplied by the user. The search request can further include search parameters specified by a service request, utilizing the metadata.

At stage 718, the hero server 120 can build a modified hero card. The modified hero card can include the new action option from stage 710. The hero server 120 can then send the new hero card to the hero agent 112. At stage 720, the hero agent 112 can cause the modified hero card to be displayed. For example, the hero agent 112 can display the hero card in the hero application 114 on the user device 110.

FIG. 8 illustrates an example hero card 810 being displayed on a user device 110. In this example, an email application 116 displays a GUI. The GUI includes an email body 805 that is displayed for the user to read. The GUI also includes an area for one or more hero cards 810. In this example, the hero card includes actions to perform in SALESFORCE, which is not otherwise accessible by the email application 116. Multiple hero cards 810 can display in the hero card area of the GUI, such as in a hero card carousel.

The hero card 810 structure can include a header region 820, body region 830, and actions region 830. Hero cards 810 can include one, two, or three of these regions, depending on the result information. The action region example illustrated in FIG. 8 contains two buttons 832 and 834. A first button 832 can be configured to contact a first backend system 130. The hero agent 112 can make compatible API calls to the first backend system 130. In this example, the first button 832 opens the contact in SALESFORCE. A second button 834 can be configured to contact a second backend system 130. The hero agent 112 can make compatible API calls to the second backend system 130. In this example, the second button 734 adds a to-do to a scheduling system.

The buttons 832 and 834 can cause the hero server 120 to instantiate a service request at the respective backend system 130, in an example. The action can cause an update at the backend system 130. For example, a button to schedule a meeting can cause a backend system 130 to schedule the meeting. This can help keep backend systems 130 synchronized with the application and other backend systems 130. In another example, a user could select to log the conversation to a third-party backend system, such as SALESFORCE, to easily record the conversation with a customer from within an e-mail application to a customer relationship management system.

In another example, the hero card button contains a direct link to the backend system 130. The user device 110 can connect to the backend system 130 using authentication credentials. These can be previously obtained credentials or the credentialing can be done through an authentication server, such as an OAuth server. The direct link can cause an action to occur at the backend system 130. As an example, an action to complete a task at the backend system 130 could cause a script, such as an SQL script, to execute on the backend system 130. The link itself can provide relevant inputs to the backend system 130, and after authentication is complete the script can execute. As an example, an email can indicate that a user has completed a task. The system can generate a hero card that includes a direct link to the backend system 130 for updating the task to indicate that the task is complete. The link can include one or more attributes identifying the user and the task to update, and the status that the user seeks to update to. When the user selects the link, the OAuth server can authenticate the user at the backend system 130. Then the backend system 130 can perform the script identified by the link. The backend system 130 can send a message back to the user device to reflect whether the update was successful. The status can display on the hero card in one example.

In another example, the buttons can vary based on the user's role or behavior. For example, where the hero server 120 determines that the user rarely interacts with the "add-to-do" button 834, the hero server can replace the button with another button. For example, the hero server 120 can provide a "comment" button that allows the user to add a comment to the corresponding item in backend system 130. In another example, the button 834 can be an "add-to-do" button for an engineer, but on the same hero card for a manager the button 834 can be a "resolve or re-assign" button.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for customizing action options in hero cards, comprising:
   displaying hero cards for a user profile on an interface, the hero cards including at least one action option;
   receiving data of user interaction behavior with the hero cards;
   determining, based on the user interaction behavior data, that a user most frequently interacts with a first action option at a first time of day and the user most frequently interacts with a second action option at a second time of day, wherein the user interaction frequency is based at least in part on a ratio of a number of user interactions with the first action option to a number of hero cards that include the first action option generated for the user profile over a measured time period; and based on the determining, at the first time of day, displaying, on the interface, a hero card with the first action option, and at the second time of day, displaying, on the interface, the hero card with the second action option.

2. The method of claim 1, wherein the determining includes determining that users assigned to a user group most frequently interact with the first action option at the first time of day and users assigned to the user group most frequently interact with the second option at the second time of day, wherein the user is assigned to the user group.

3. The method of claim 1, wherein displaying the hero card for the user profile with the first action option includes:
generating a first hero card that includes the first action option, and
displaying the first hero card on the interface,
wherein displaying the hero card with the second action option includes:
generating a second hero card that includes the second option,
removing the first hero card from the interface, and
adding the second hero card to the interface.

4. The method of claim 1, further comprising:
receiving usage data from an application, the usage data corresponding to actions performed within the application under the user profile;
creating a third action option based on the user data; and
modifying a parameter so that hero cards created for the user profile include the third action option.

5. The method of claim 1, further comprising:
detecting an email sent to an email address associated with the user profile, the email including information indicating a state change performed in the second application; and
modifying which of the at least one action items are included in the generation of hero cards based on the state change.

6. The method of claim 1, wherein:
the hero card is of a first hero card type corresponding to emails received from an email address,
the first action option corresponds to replying to emails received from the email address, and
the second action option corresponds to selecting a uniform resource locator ("URL") included in emails received from the email address.

7. A non-transitory, computer-readable medium containing instructions that, when executed by a hardware-based processor, performs stages for customizing action options in hero cards, the stages comprising:
displaying hero cards for a user profile on an interface, the hero cards including at least one action option;
receiving data of user interaction behavior with the hero cards;
determining, based on the user interaction behavior data, that a user most frequently interacts at a first time of day and the user most frequently interacts with a second action option of the at least one action option at a second time of day; and
based on the determining,
at the first time of day, displaying, on the interface, a hero card with the first action option, and at the second time of day, displaying, on the interface, the hero card with the second action option, wherein,
the hero card is of a first hero card type corresponding to emails received from an email address,
the first action option corresponds to replying to emails received from the email address, and
the second action option corresponds to selecting a uniform resource locator ("URL") included in emails received from the email address.

8. The non-transitory, computer-readable medium of claim 7, wherein the determining includes determining that users assigned to a user group most frequently interact with the first action option at the first time of day and users assigned to the user group most frequently interact with the second option at the second time of day.

9. The non-transitory, computer-readable medium of claim 7, wherein displaying the hero card for the user profile with the first action option includes:
generating a first hero card that includes the first action option, and
displaying the first hero card on the interface,
wherein displaying the hero card with the second action option includes:
generating a second hero card that includes the second option,
removing the first hero card from the interface, and
adding the second hero card to the interface.

10. The non-transitory, computer-readable medium of claim 7, the stages further comprising:
receiving usage data from an application, the usage data corresponding to actions performed within the application under the user profile;
creating a third action option based on the user data; and
modifying a parameter so that hero cards created for the user profile include the third action option.

11. The non-transitory, computer-readable medium of claim 7, wherein the user interaction frequency is based at least in part on a ratio of a number of user interactions with the first action option to a number of hero cards that include the first action option generated for the user profile over a measured time period.

12. The non-transitory, computer-readable medium of claim 7, the stages further comprising:
detecting an email sent to an email address associated with the user profile, the email including information indicating a state change performed in an application associated with the user profile; and
modifying which of the at least one action items are included in the generation of hero cards based on the state change.

13. A system for customizing action options in hero cards, comprising:
a memory storage including a non-transitory, computer-readable medium comprising instructions; and
a hardware-based processor that executes the instructions to carry out stages comprising:
displaying hero cards for a user profile on an interface, the hero cards including at least one action option;
receiving data of user interaction behavior with the hero cards;
determining, based on the user interaction behavior data, that a user most frequently interacts with a first action option at a first time of day and the user most frequently interacts with a second action option at a second time of day;
based on the determining, at the first time of day, displaying, on the interface, a hero card with the first action option, and at the second time of day, displaying, on the interface, the hero card with the second action option;

detecting an email sent to an email address associated with the user profile, the email including information indicating a state change performed in an application associated with the user profile; and modifying which of the at least one action items are included in the generation of hero cards based on the state change.

14. The system of claim 13, wherein the determining includes determining that users assigned to a user group most frequently interact with the first action option at the first time of day and users assigned to the user group most frequently interact with the second option at the second time of day.

15. The system of claim 13, wherein displaying the hero card for the user profile with the first action option includes:

generating a first hero card that includes the first action option, and displaying the first hero card on the interface, wherein displaying the hero card with the second action option includes:

generating a second hero card that includes the second option, removing the first hero card from the interface, and adding the second hero card to the interface.

16. The system of claim 13, the stages further comprising:

receiving usage data from an application, the usage data corresponding to actions performed within the application under the user profile;

creating a third action option based on the user data; and modifying a parameter so that hero cards created for the user profile include the third action option.

17. The system of claim 13, the stages further comprising:

receiving usage data from an application, the usage data corresponding to actions performed within the application under the user profile;

creating a third action option based on the user data; and modifying a parameter so that hero cards created for the user profile include the third action option.

\* \* \* \* \*